(12) United States Patent
Huyser et al.

(10) Patent No.: US 8,513,312 B2
(45) Date of Patent: *Aug. 20, 2013

(54) HYDROCARBON SYNTHESIS PROCESS

(75) Inventors: Johannes Jacobus Huyser, Parys (ZA);
Riaan Bekker, Sasolburg (ZA);
Matthys Josephus Janse Van Vuuren, Sasolburg (ZA); Ryno Kotze, Sasolburg (ZA)

(73) Assignee: Sasol Technology (PTY) Limited, Johannesburg (ZA)

( * ) Notice: Subject to any disclaimer, the term of this patent is extended or adjusted under 35 U.S.C. 154(b) by 446 days.

This patent is subject to a terminal disclaimer.

(21) Appl. No.: 12/672,981

(22) PCT Filed: Aug. 5, 2008

(86) PCT No.: PCT/IB2008/053134
§ 371 (c)(1),
(2), (4) Date: Mar. 31, 2011

(87) PCT Pub. No.: WO2009/022261
PCT Pub. Date: Feb. 19, 2009

(65) Prior Publication Data
US 2011/0178189 A1      Jul. 21, 2011

(30) Foreign Application Priority Data
Aug. 10, 2007   (ZA) .................... 2007/06647

(51) Int. Cl.
*C07C 27/00* (2006.01)
*B01J 20/34* (2006.01)

(52) U.S. Cl.
USPC ............... 518/700; 518/715; 502/34

(58) Field of Classification Search
USPC ................... 518/700, 715; 502/34
See application file for complete search history.

(56) References Cited

FOREIGN PATENT DOCUMENTS
WO   WO 2008/008076 A1   1/2008

OTHER PUBLICATIONS

Shin et al., JP abstract 61090739, 1986.*
Robert J. O'Brien et al., "Activity and selectivity of precipitated iron Fischer-Tropsch catalysts," Catalysis Today, 36 (1997), pp. 325-334.
International Search Report from the European Patent Office for International Application No. PCT/IB2008/053134 (May 12, 2009).
Bukur, et al., "Pretreatment Effect Studies with a Precipitated Iron Fischer-Tropsch Catalyst in a Slurry Reactor", XP-002517252, Applied Catalysis A:General, vol. 186, pp. 255-275, (1999).
Bukur, et al, "Activation Studies with a Precipitated Iron Catalyst for Fischer-Tropsch Synthesis", XP-002517251, Journal of Catalysis, vol. 155, pp. 386-375, (1995).
Teng, et al., "Oxygenate Kinetics in Fischer-Tropsch Synthesis over an Industrial Fe-Mn Catalyst", XP-002517253, Fuel, vol. 84, pp. 791-800, (2005).
O'Brien, et al., "Activation Study of Precipitated Iron Fischer-Tropsch Catalysts", XP-002517250, Energy & Fuels, vol. 10, pp. 1-8, (Jul. 18, 1996).

* cited by examiner

*Primary Examiner* — Jafar Parsa
(74) *Attorney, Agent, or Firm* — Finnegan Henderson Farabow Garrett & Dunner LLP

(57) ABSTRACT

This invention relates to a Fischer Tropsch process using a catalyst activated in accordance with the invention. More particularly the invention relates to a three phase Low Temperature Fischer Tropsch process wherein CO and $H_2$ are converted to hydrocarbons and possibly oxygenates thereof by contacting syngas including CO and $H_2$ in the presence of an iron based Fischer Tropsch catalyst, wherein the ratio of $H_2$:CO in the feed is between 2.5 and 1, and wherein the iron based Fischer Tropsch catalyst is activated according to the steps of: (a) providing an iron catalyst including iron in a positive oxidation state; and (b) contacting the iron catalyst in a reactor with a reducing gas selected from CO and a combination of $H_2$ and CO; at a temperature of at least 245° C. and below 280° C.; at a reducing gas pressure of above 0.5 MPa and not more than 2.2 MPa; and at a GHSV of total gas fed to the reactor of at least 6000 ml(N)/g cat/h, thereby reducing the iron that is in a positive oxidation step in the catalyst.

10 Claims, No Drawings

HYDROCARBON SYNTHESIS PROCESS

FIELD OF THE INVENTION

This invention relates to a Fischer Tropsch process using a catalyst activated in accordance with the invention.

BACKGROUND ART

A Fischer-Tropsch (FT) process comprises the hydrogenation of CO in the presence of a catalyst based on metals, such as Fe, Co and Ru. The products formed from this reaction are water, gaseous, liquid and waxy hydrocarbons which may be saturated or unsaturated. Oxygenates of the hydrocarbons such as alcohols, acids, ketones and aldehydes are also formed.

A heterogeneous Fisher-Tropsch process may be conveniently categorised as either a high temperature Fischer-Tropsch (HTFT) process or a low temperature Fischer-Tropsch (LTFT) process. The HTFT process can be described as a two phase Fischer-Tropsch process. It is usually carried out at a temperature from 250° C. to 400° C. and the catalyst employed is usually an iron-based catalyst. Generally, the process is commercially carried out in a fluidised bed reactor.

The LTFT process can be described as a three phase Fischer-Tropsch process. It is usually carried out at a temperature from 220° C. to 310° C. and the catalyst employed is usually either a Co-based catalyst or a Fe-based catalyst. The conditions under which this process is carried out, results in the products being in a liquid and possibly also in a gas phase in the reactor. Therefore this process can be described as a three phase process, where the reactants are in the gas phase, at least some of the products are in the liquid phase and the catalyst is in a solid phase in the reaction zone. Generally this process is commercially carried out in a fixed bed reactor or a slurry bed reactor.

It is well-known that HTFT synthesis is preferred for the production of high value linear alkenes, and iron catalysts, operating at high temperatures in fluidised bed reactors, remain the catalysts of choice. LTFT synthesis using iron catalysts are usually the synthesis procedure of choice for the conversion of coal-derived synthesis gas ($H_2$ and CO) to hydrocarbon products.

It is well known that in LTFT, especially in the production of heavy hydrocarbon products, a common problem is the relative slow synthesis rate and short catalyst lifetime. It is normal practise to try and solve such problems by an increase in reaction temperature to increase reaction rate, but this has lead to an increase in lighter hydrocarbon production (notably methane) as well as catalyst deactivation that results in a short catalyst lifetime.

Most procedures for preparing an iron based catalyst for FT synthesis produces a non-reduced catalyst wherein at least some (usually most) of the iron in the catalyst is in a positive oxidation state. In order to provide a catalyst which is active in FT synthesis (an activated FT catalyst) the catalyst has to be reduced to convert iron in the positive oxidation state to iron in a zero oxidation state.

Catalysis Today 36 (1997) 325; Canadian J. Chem. Eng., 74 (1996) 399-404; Applied Catalysis. A: General 186 (1999) 255-275; Journal of Catalysis 155, (1995) 366-375 and Energy and Fuels, 10 (1996) 921-926 describe different catalyst activation procedures and their influence on FT synthesis. The influence of different reducing gasses ($H_2$, CO, or a combination of $H_2$ and CO) used during activation is disclosed. Reduction at different pressures and temperatures are also disclosed. However, none of the documents disclose the activation conditions of the present invention and little emphasis is placed on the combination of the activation of the catalyst and the conditions under which the FT process in respect of activity and stability.

It has now been found that a Fischer Tropsch synthesis carried out under the conditions of the present invention together with the conditions according to the invention under which the Fischer Tropsch synthesis catalyst is activated results in an increase in Fischer Tropsch activity with little or no loss in respect of the stability of the catalyst.

SUMMARY OF THE INVENTION

According to the present invention there is provided a three phase Low Temperature Fischer Tropsch process wherein a feed of CO and $H_2$ is converted to hydrocarbons and possibly oxygenates thereof by contacting syngas including CO and $H_2$ in the presence of an iron based Fischer Tropsch catalyst, wherein the ratio of $H_2$:CO in the feed is between 2.5 and 1, and wherein the iron based Fischer Tropsch catalyst is activated according to the steps of:

(a) providing an iron catalyst including iron in a positive oxidation state; and (b) contacting the iron catalyst in a reactor with a reducing gas selected from CO and a combination of $H_2$ and CO; at a temperature of at least 245° C. and below 280° C.; at a reducing gas pressure of above 0.5 MPa and not more than 2.2 MPa; and at a GHSV of total gas fed to the reactor of at least 6000 ml(N)/g cat/h, thereby reducing the iron that is in a positive oxidation state in the catalyst.

It will be appreciated that it is the combination of the conditions under which the LTFT process is conducted and the conditions for the activation of the iron based catalyst which form the basis of the invention.

Low Temperature Fischer Tropsch Process

The above LTFT process is conducted under three phase LTFT process conditions, wherein, under the reaction conditions, the reactants are in a gas phase, at least some of the products are in a liquid phase and the catalyst is in a solid phase.

Preferably the LTFT process is carried out in a slurry bed reactor or a fixed bed reactor. Preferably the reactor is a slurry bed reactor.

The process may be carried out at a pressure above atmospheric pressure, preferably from 1.5 MPa to 5.0 MPa, preferably 2.0 MPa to 40 MPa and more preferably between 2.2 MPa to 3.5 MPa.

Further, the process may be carried out at a temperature of from 220° C. to 270° C., preferably 230° C. to 265° C. and most preferably between 240° C. to 260° C.

The $H_2$:CO molar ratio may preferably be 1.5.

The iron based Fischer Tropsch catalyst may be activated separately from and prior to the LTFT process or it may be activated in situ.

The GHSV of total syngas fed to the reactor is at least 6000 ml(N)/g cat/h. Preferably said GHSV is at least 7000 ml(N)/g cat/h, preferably at least 9000 ml(N)/g cat/h, preferably at least 10000 ml(N)/g cat/h.

Activation of Iron Based LTFT Catalyst

The catalyst may comprise a low temperature Fischer-Tropsch catalyst, that is a catalyst suitable to be used in a three-phase FT process, preferably in a slurry bed reactor.

The iron catalyst may include one or more promotors such as a promotor that enhances reduction and/or a structural promotor.

The iron catalyst may include a promotor in the form of a source of an alkali metal and/or an alkaline earth metal.

Preferably the promotor is in the form of a source of an alkali metal and preferably the alkali metal is K, Na or Cs, preferably it is K. Preferably the source of alkali metal is an alkali metal oxide such as $Na_2O$, $K_2O$ or $Cs_2O$, preferably it is $K_2O$. The alkali metal may be present at a concentration of 3 to 6 g alkali metal oxide/100 gFe, preferably 4.3 to 5 g alkali metal oxide/100 gFe.

The iron catalyst may also include a transition metal promotor and preferably the transition metal is Cu. It is believed that Cu enhances reduction of an iron based catalyst. The Cu may be present at a concentration of 0.5 to 8 g Cu/100 gFe, preferably from 3 to 6 g Cu/100 gFe.

The iron catalyst may also include a structural promotor, and preferably it is $SiO_2$. The $SiO_2$ may be present at a concentration of 7 to 45 g $SiO_2$/100 gFe, preferably from 22 to 26 g $SiO_2$/100 gFe.

The catalyst may be prepared by any suitable procedure such as precipitation.

Preferably at least some of the iron is present as $Fe^{2+}$ and/or $Fe^{3+}$ prior to reduction and preferably at least some of the iron is reduced to Fe(0).

Preferably not more than 15%, preferably not more than 10%, preferably 0% by mass of the iron in the catalyst is in Fe(0) form prior to reduction according to the present invention.

The catalyst may be provided in a fixed bed in the reactor, but preferably the catalyst is provided in a slurry bed in the reactor. The catalyst may be mixed with a suitable carrier such as a wax to prepare a slurry bed in a slurry bed reactor.

Reactor

Any suitable reactor may be used to reduce the iron catalyst. Preferably the reactor is a reactor suitable for carrying out LTFT synthesis. Preferably the reactor is fixed bed reactor or a slurry bed reactor. Preferably the reactor is a slurry bed reactor.

Reducing Gas

As stated above, the reducing gas comprises a gas selected from CO and a combination of $H_2$ and CO. The combination of $H_2$ and CO is also known as syngas. Preferably the reducing gas is a combination of $H_2$ and CO. The syngas may be prepared in any suitable manner and in one embodiment of the invention the syngas may be coal derived syngas. Preferably the $H_2$/CO molar ratio is from 100:1 to 1:100, preferably from 5:1 to 1:5, preferably from 1:2 to 2:1.

The reducing gas may form part of a feed gas which includes one or more other gasses such as, for example, light hydrocarbon products of FT synthesis, or inert gasses for instance $CO_2$, argon and nitrogen.

Reduction Temperature

As stated above the temperature at which reduction of the catalyst is carried out is at least 245° C. and below 280° C., preferably below 270° C. and more preferably between 250° C. to 265° C.

Reduction Pressure

As stated above reduction of the catalyst is carried out at a reducing gas pressure above 0.5 MPa and not more than 2.2 MPa.

It will be appreciated that the reducing gas pressure is the pressure of all reducing gas in the reactor capable of reducing iron under the conditions present in the reactor, and excludes the pressure of all gas that does not reduce iron (such as $CO_2$ and argon).

Preferably the said pressure is below 2.0 MPa and above 0.5 MPa. Preferably said pressure is from 1.0 MPa to 1.8 MPa.

GHSV

As stated above the GHSV of total gas fed to the reactor is at least 6000 ml(N)/g cat/h. Preferably said GHSV is at least 7000 ml(N)/g cat/h, preferably at least 9000 ml(N)/g cat/h, preferably at least 10000 ml(N)/g cat/h.

Reduction

Reduction time may be up to 36 hours, preferably up to 24 hours, preferably up to 16 hours.

According to another aspect of the present invention there is provided the use of a catalyst activated as described above in a FT process, preferably an LTFT process.

The invention will now be further described by means of the following non-limiting examples.

EXAMPLES

The Fe based catalyst used in the examples was prepared to have the specifications set out below and was prepared according to the procedure described by Frohning et al (C. D. Frohning, W. Rotting, F. Schnur, J. Falbe (Ed), "Chemierohstoffe aus kohle", Thieme, Stuttgart, 1977, p 234.)

| | |
|---|---|
| Fe | 45-60 mass % |
| Cu | 3-6 g/100 g Fe |
| $K_2O$ | 4.3-5 g/100 g Fe |
| $SiO_2$ | 22-26 g/100 g Fe |

Discussion

The Applicant also sets out below examples relating to different conditions under which the LTFT process was conducted, the catalyst being prepared as discussed above. These examples will show the optimum FTS conditions for the catalyst according to the invention

TABLE 1

Activation and synthesis conditions for examples 1 to 6

| | Activation | | | | |
|---|---|---|---|---|---|
| Example | Activation temp. (° C.) | Activation pressure (MPa) | Activation gas ($H_2$/CO) molar ratio | Activation GHSV (ml(N)/g cat/h) | Activation time (h) |
| 1 | 255 | 1.5 | 1.5 | 10500 | 16 |
| 2 | 255 | 1.5 | 1.5 | 10500 | 16 |
| 3 | 255 | 1.5 | 1.5 | 11000 | 16 |
| 4 | 255 | 1.5 | 1.5 | 11000 | 16 |
| 5 | 255 | 1.5 | 1.5 | 11000 | 16 |
| 6 | 255 | 1.5 | 1.5 | 12000 | 16 |

TABLE 1-continued

Activation and synthesis conditions for examples 1 to 6

| | Synthesis | | | | | |
|---|---|---|---|---|---|---|
| Example | Synthesis temp (° C.) | Synthesis pressure (MPa) | GHSV (ml(N)/g cat/h) | Initial FT reaction rate (mole CO/g cat/sec) | Loss in FT activity after ~500 hours | Methane production by mass of total product produced |
| 1 | 240 | 2.1 | 3500 | $0.5 \times 10^{-5}$ | 0% | 1.6% |
| 2 | 245 | 2.65 | 3500 | $0.7 \times 10^{-5}$ | 0% | 3% |
| 3 | 245 | 2.65 | 11000 | 1.3 | 0%(1100 h) | 4% |
| 4 | 250 | 2.65 | 11000 | 1.7 | 0%(1100 h) | 4% |
| 5 | 255 | 2.65 | 11000 | $1.9 \times 10^{-5}$ | 0% | 4% |
| 6 | 245 | 2.0 | 5600 | $0.9 \times 10^{-5}$ | 33%(500 h) 45%(700 h) | 1.7-3% (700 h) |

Example 1

This example is concerned with an FT process that is run under conditions that are not optimised but wherein the activation of the catalyst is according to the present invention. (The example also serves as a comparative example in respect of an FT process run under optimised conditions and wherein the catalyst is activated according to the invention.)

20 gram of a Fe based catalyst described above was added to 350 g of the commercially produced H1 wax at 150° C. in a slurry reactor. The slurry reactor was closed and pressurised with argon to 15 bar (1500 kPa). The temperature of the reactor was increased to 255° C. and at that temperature, syngas ($H_2$/CO molar ratio of 1.5) was passed through the reactor at a GHSV of 10500 ml(N)/g cat/h and maintained for 16 hours. A fresh feed and tail gas GC analysis was done and used to calculate rates and conversions. After this activation/reduction period the temperature was changed to 240° C. and the reactor pressure increased to 21 bar (2100 kPa) and the GHSV dropped to 3500 ml(N)/g cat/h to maximise the FT synthesis reaction rate for the production of hydrocarbon products. The FT reaction rate remained constant at $0.5 \times 10^{-5}$ mole CO/g cat/sec with no loss in activity detected for at least 500 hours. The methane selectivity stabilised at 1.6% indicating no change in overall selectivity. (See also Table 1)

Example 2

This example is concerned with an FT process that is run under conditions that are not optimised.

20 gram of a Fe based catalyst described above was added to 350 g of commercially produced H1 wax at 150° C. in a slurry reactor. The slurry reactor was closed and pressurised with argon to 15 bar. The temperature of the reactor was increased to 255° C. and at that temperature, syngas ($H_2$/CO molar ratio of 1.5) was passed through the reactor at a GHSV of 10500 ml(N)/g cat/h and maintained for 16 hours. A fresh feed and tail gas GC analysis was done and used to calculate rates and conversions. After this activation/reduction period the temperature and pressure was changed to 245° C. and 26.5 bar and the GHSV was dropped to 3500 ml(N)/g cat/h with a syngas ratio of 1.5. The FT reaction rate stabilised at $0.7 \times 10^{-5}$ mole CO/g cat/sec with no loss in activity for at least 500 hours and the methane selectivity stabile at 3%.

Example 3

This example is concerned with an FT process run under optimised conditions according to the invention.

20 gram of a Fe based catalyst described above was added to 350 g of the commercially produced H1 wax at 150° C. in a slurry reactor. The slurry reactor was closed and pressurised with argon to 15 bar (1500 kPa). The temperature of the reactor was increased to 255° C. and at that temperature, syngas ($H_2$/CO molar ratio of 1.5) was passed through the reactor at a GHSV of 11000 ml(N)/g cat/h and maintained for 16 hours. A fresh feed and tail gas GC analysis was done and used to calculate rates and conversions. After this activation/reduction period the temperature was changed to 245° C. and the reactor pressure increased to 26.5 bar (2650 kPa) to maximise the FT synthesis reaction rate for the production of hydrocarbon products. The FT reaction rate remained constant at $1.3 \times 10^{-5}$ mole CO/g cat/sec till at least 1100 hours. The methane selectivity stabilised at 4% indicating no change in overall selectivity.

Example 4

This example is concerned with an FT process run under optimised conditions and according to the invention.

10 gram of a Fe based catalyst described above was added to 350 g of the commercially produced H1 wax at 150° C. in a slurry reactor. The slurry reactor was closed and pressurised with argon to 15 bar. The temperature of the reactor was increased to 255° C. and at that temperature, syngas ($H_2$/CO molar ratio of 1.5) was passed through the reactor at a GHSV of 11000 ml(N)/g cat/h and maintained for 16 hours. A fresh feed and tail gas GC analysis was done and used to calculate rates and conversions. After this activation/reduction period the temperature was lowered to 250° C. and the reactor pressure increased to 26.5 bar (2650 kPa) to maximise the FT synthesis reaction rate for the production of hydrocarbon products. The FT reaction rate was constant at $1.7 \times 10^{-5}$ mole CO/g cat/sec till at least 1100 hours. The methane selectivity stabilised at 4% indicating no change in overall selectivity.

Example 5

This example is concerned with an FT process run under optimised conditions according to the invention.

10 gram of a Fe based catalyst described above was added to 350 g of the commercially produced H1 wax at 150° C. in a slurry reactor. The slurry reactor was closed and pressurised with argon to 15 bar (1500 kPa). The temperature of the reactor was increased to 255° C. and at that temperature, syngas ($H_2$/CO molar ratio of 1.5) was passed through the reactor at a GHSV of 11000 ml(N)/g cat/h and maintained for 16 hours. A fresh feed and tail gas GC analysis was done and used to calculate rates and conversions. After this activation/ reduction period the temperature was kept at 255° C. and the reactor pressure increased to 26.5 bar to maximise the FT synthesis reaction rate for the production of hydrocarbon products. The FT reaction rate was constant at $1.9 \times 10^{-5}$ mole CO/g cat/sec for at least 500 hours. The methane selectivity stabilised at 4% indicating no change in overall selectivity.

Example 6

10 gram of a Fe based catalyst described above was added to 350 g of the commercially produced H1 wax at 150° C. in a slurry reactor. The slurry reactor was closed and pressurised with argon to 15 bar (1500 kPa). The temperature of the reactor was increased to 255° C. and at that temperature, syngas ($H_2$/CO molar ratio of 1.5) was passed through the reactor at a GHSV of 12000 ml(N)/g cat/h and maintained for 16 hours. A fresh feed and tail gas GC analysis was done and used to calculate rates and conversions. After this activation/reduction period the temperature was changed to 245° C. and the reactor pressure increased to 20 bar (2000 kPa) and the GHSV dropped to 5600 ml(N)/g cat/h. The FT reaction rate remained constant at $0.9 \times 10^{-5}$ mole CO/g cat/sec for the first 200 h but dropped to $0.5 \times 10^{-5}$ mole CO/g cat/sec after 700 hours. After a stable period for the first 200 h the methane selectivity gradually increased from ~1.7 to 3% after 700 h.

From the examples it will be clear that when the catalyst that is activated according to the present invention is not operated under the Fischer Tropsch process conditions according to the present invention a clear drop in Fischer Tropsch activity (examples 1, 2 and 6) and stability (example 6) is observed compared to the catalyst activated and operated under the conditions specified in the present invention that clearly shows an increase in Fischer Tropsch activity with no loss in stability (examples 3, 4 and 5).

The invention claimed is:

1. A three phase Low Temperature Fischer Tropsch process comprising converting a feed of CO and $H_2$ to hydrocarbons and possibly oxygenates thereof by contacting syngas including CO and $H_2$ in the presence of an iron based Fischer Tropsch catalyst at a GHSV of the feed of CO and $H_2$ of at least 6000 ml(N)/g cat/h, wherein the ratio of $H_2$:CO in the feed is between 2.5 and 1, and wherein the iron based Fischer Tropsch catalyst is activated according to the steps of:

(a) providing an iron catalyst including iron in a positive oxidation state; and (b) contacting the iron catalyst in a reactor with a reducing gas selected from CO and a combination of $H_2$ and CO at a $H_2$:CO molar ratio of from 100:1 to 1:100; at a temperature of at least 245° C. and below 280° C.; at a reducing gas pressure of above 0.5 MPa and not more than 2.2 MPa; and at a GHSV of total gas fed to the reactor of at least 6000 ml(N)/g cat/h, thereby reducing the iron that is in a positive oxidation state in the catalyst.

2. The process of claim 1, wherein the iron based catalyst includes one or more promoters selected from the group consisting of a source of alkali metal, a source of an alkaline earth metal, a source of Cu and a source of a Si.

3. The process of claim 2, wherein the iron based catalyst includes between 0.5 to 8 g of Cu per 100 g of Fe.

4. The process of claim 1, wherein the reducing gas comprises a mixture of $H_2$ and CO, the ratio of $H_2$:CO in the reducing gas being from 5:1 to 1:5.

5. The process of claim 1, wherein the reduction temperature is from 250° C. to 265° C.

6. The process of claim 1, wherein the GHSV of the reducing gas is at least 10,000 ml(N)/g cat/h.

7. The process of claim 1, wherein the ratio of $H_2$:CO in the feed is 1.5.

8. The process of claim 1, wherein the conversion of $H_2$ and CO in the feed is carried out at a temperature of from 220° C. to 270° C.

9. The process of claim 1, wherein the conversion of $H_2$ and CO in the feed is carried out at a pressure between 15 to 50 bar.

10. The process of claim 1, wherein the GHSV of the feed of $H_2$ and CO is at least 10,000 ml(n)/g cat/h.

* * * * *